Sept. 13, 1927.
J. D. HERRON
HOISTING TRUCK
Filed Jan. 5, 1927
1,641,971
4 Sheets-Sheet 2
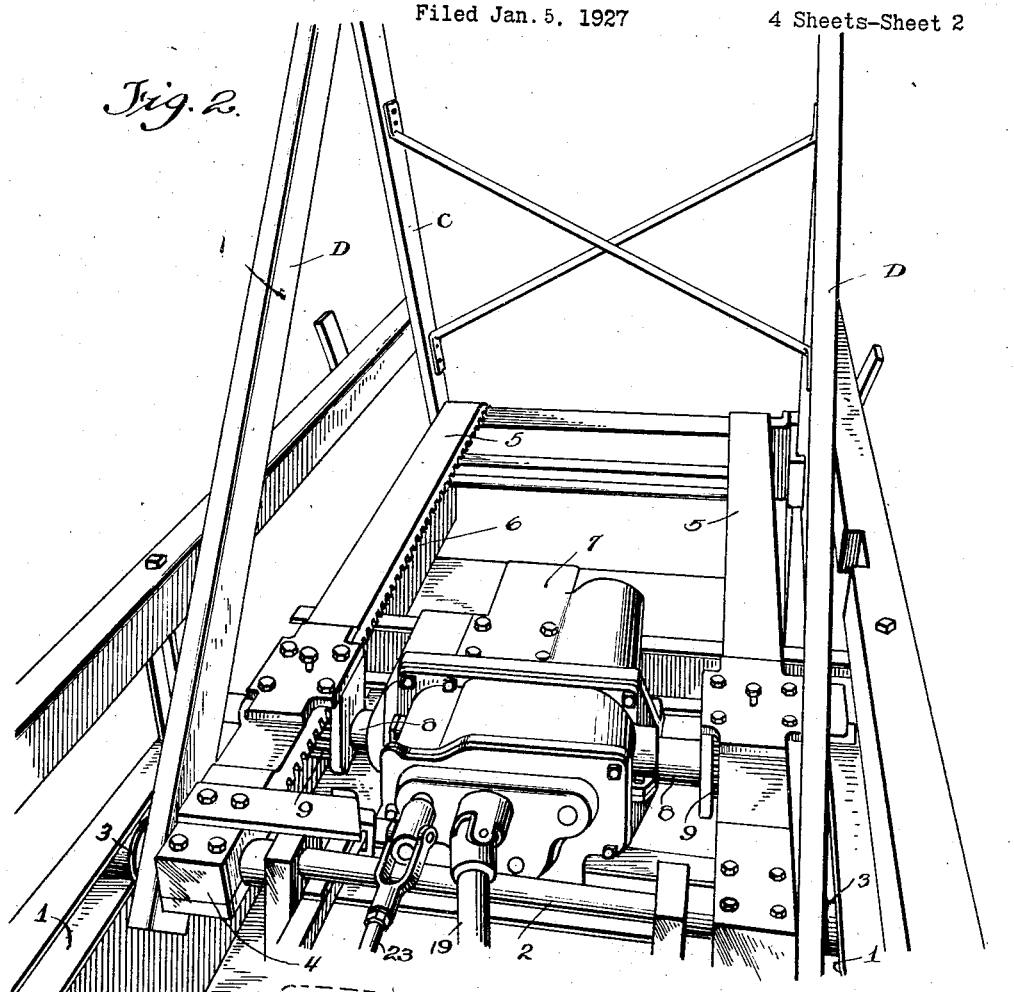
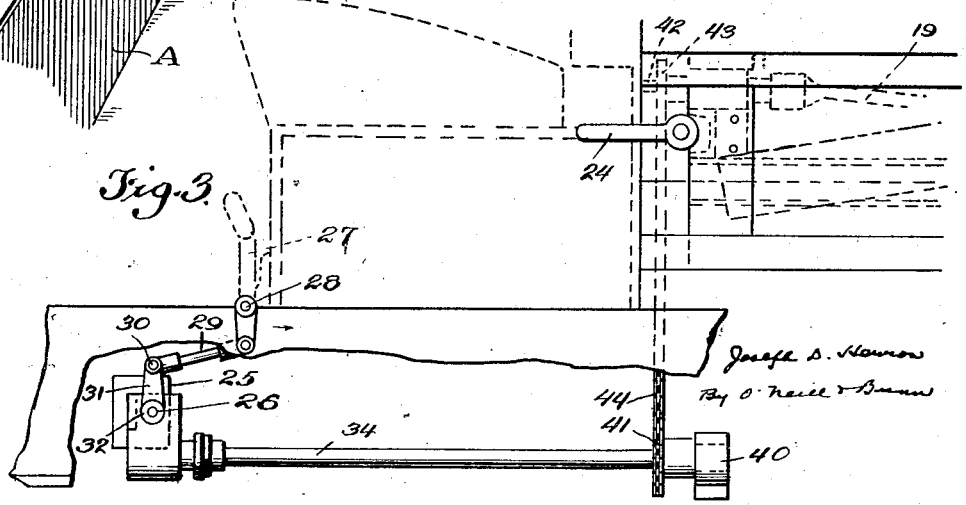

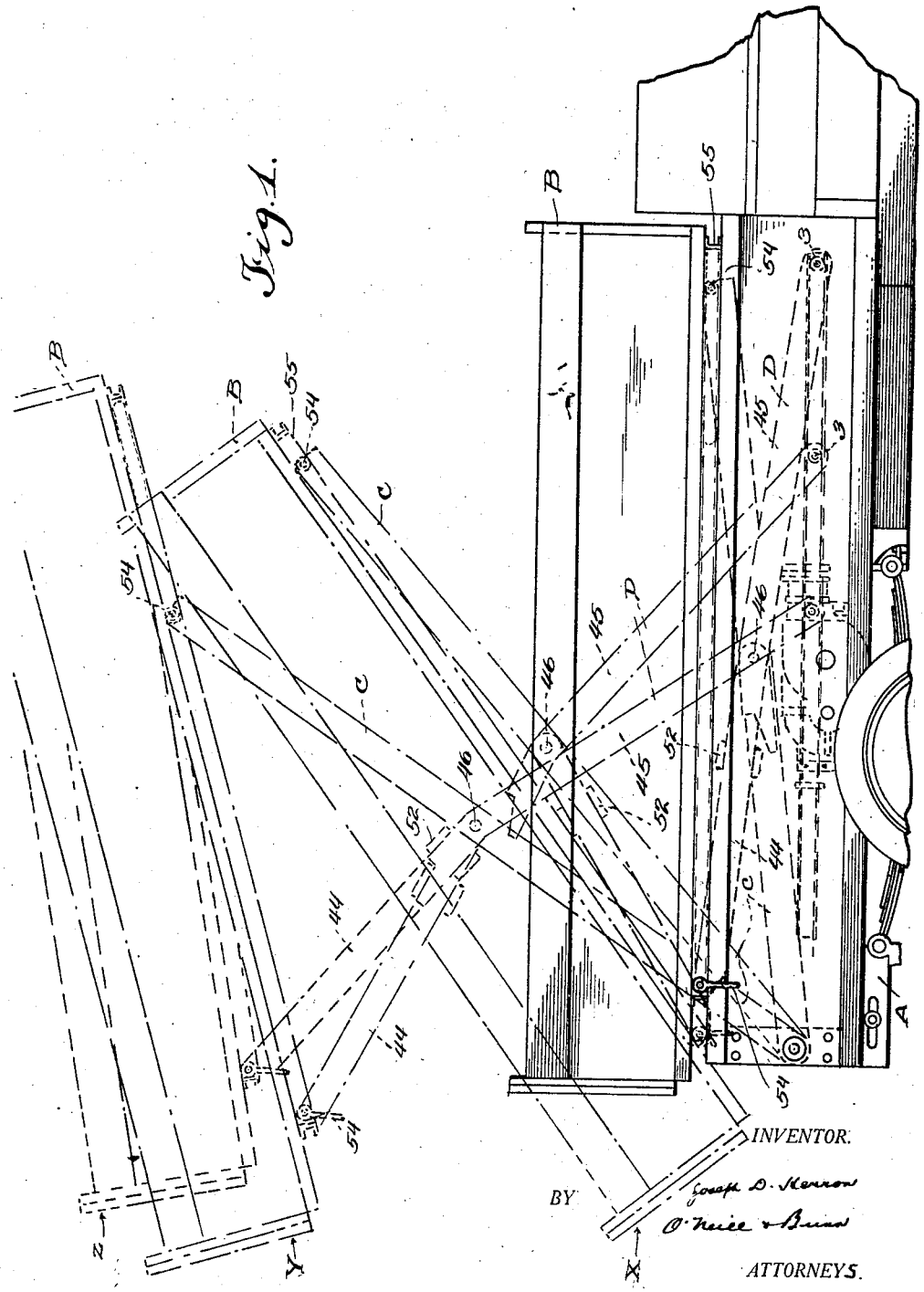

Sept. 13, 1927.
J. D. HERRON
1,641,971
HOISTING TRUCK
Filed Jan. 5, 1927
4 Sheets-Sheet 3
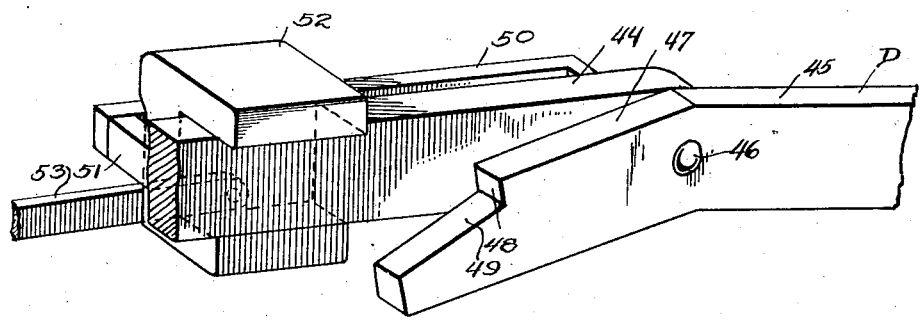
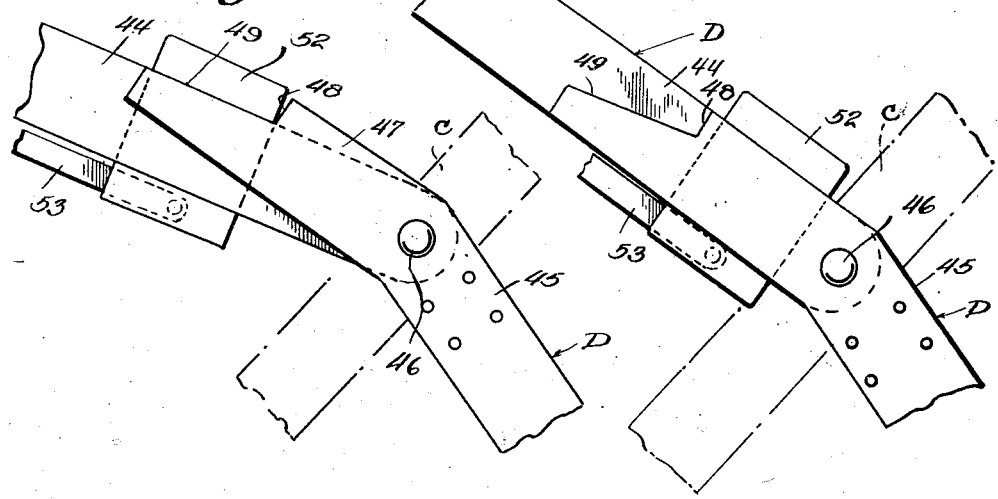
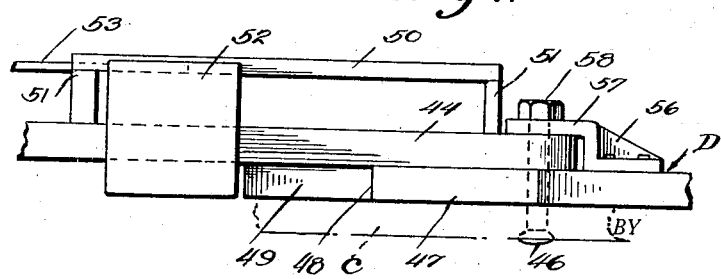
PROPRIETOR.
Joseph D. Herron
O'Neill & Burns
BY
ATTORNEYS

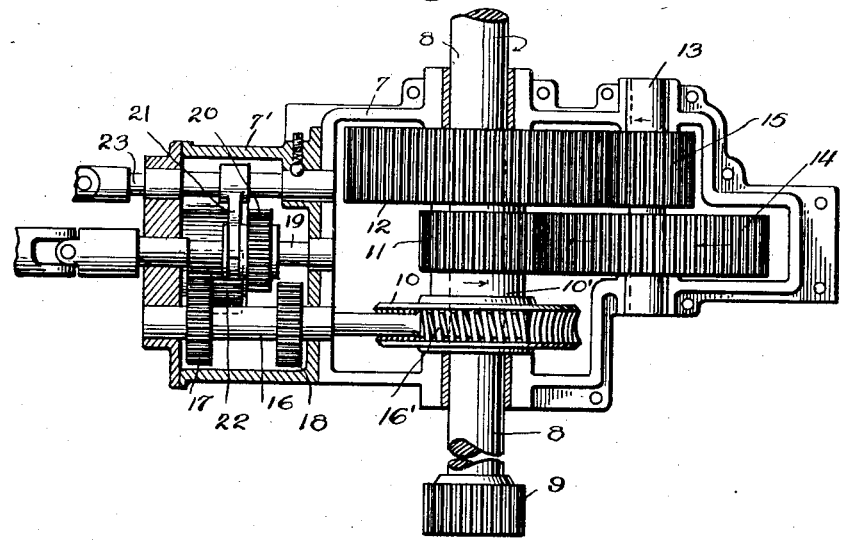
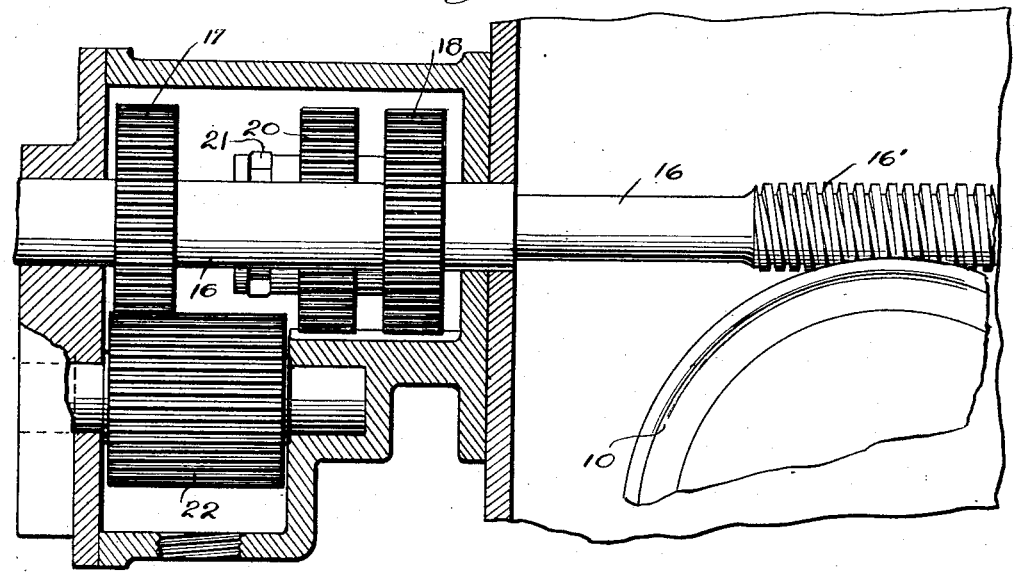
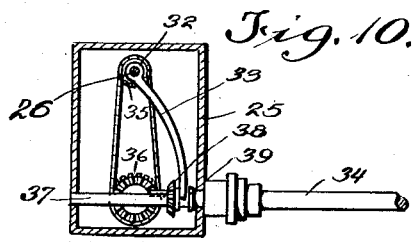

Patented Sept. 13, 1927.

1,641,971

UNITED STATES PATENT OFFICE.

JOSEPH D. HERRON, OF TRENTON, NEW JERSEY, ASSIGNOR TO FITZ GIBBON & CRISP, INC., OF TRENTON, NEW JERSEY, A CORPORATION OF NEW JERSEY.

HOISTING TRUCK.

Application filed January 5, 1927. Serial No. 159,232.

The present invention relates to certain improvements in that type of dumping automobile trucks, provided with a body or superstructure carried by a fixed frame mounted on the chassis of the truck, and in which the body is raised and simultaneously tilted at certain angles, thereby facilitating the operation of discharging the contents of the body from one end thereof, such as embodied in my Patent No. 1,533,595, issued April 14, 1925.

It is customary to equip a dumping truck of this character with an extensible discharge chute at the rear end, and to elevate the entire load-carrying body to a point above the truck chassis. It is also desirable to provide means for elevating the body and simultaneously tilting it to incline downwardly and rearwardly at varying angles, dependent upon whether it is desired to deliver the load to a point adjacent or remote from the rear end of the vehicle, the extensible chute being adjusted accordingly.

It is the object of this invention to provide means for facilitating the operation of adjusting the load-carrying body prior to its elevation, in order that it will assume the desired predetermined inclined position upon being elevated.

Other objects of the invention will be disclosed in the following specification when taken in connection with the drawings forming a part thereof, in which similar reference characters indicate similar elements throughout the several views.

In certain respects the present invention is similar to that embodied in the patent referred to. However the patented structure is manually operated and capable of only two positions of inclination, while the structure disclosed in the present application is power operated, and adapted to be so adjusted as to permit three positions of inclination.

In said drawings:

Fig. 1 is a side elevational view of the body portion of a hoisting truck equipped with the structure embodying the invention, the dotted lines showing the body in its three different positions of inclination.

Fig. 2 is a fragmentary perspective view of a portion of the truck chassis, showing the power mechanism for varying the position of the hoisting arms.

Fig. 3 is a fragmentary detail, partly in dotted lines, showing means whereby to connect the hoisting mechanism to the regular driving mechanism.

Fig. 4 is a detailed perspective of the adjacent ends of pivotally connected hoisting arms, showing the locking dog in one position of adjustment.

Fig. 5 is a similar view showing the dog in another position of adjustment.

Fig. 6 is a similar view showing the locking dog in still another position of adjustment.

Fig. 7 is a top plan view of the meeting ends of said arms and said dog.

Fig. 8 is a top plan view of the power hoisting gearing, the top of the gear box being removed, and, Fig. 9 is a vertical section taken through the gear box, the gearing being shown in full lines, and, Fig. 10 is a sectional detail showing the clutch operating mechanism for transferring power from the engine to the hoisting devices.

Now referring specifically to the drawings, in which similar reference characters indicate similar parts throughout the several views, A indicates generally, a truck chassis, and B a load-carrying body, adapted to be raised and lowered by power from the truck motor. The body B is pivotally supported on hoisting arms C, C, and D, D, the arms being arranged in pairs, as illustrated in dotted lines in Fig. 1, and in full lines in Fig. 2. Each of the forwardly extending arms C, is pivotally connected, at about its center, to one of the rearwardly extending arms D, the lower ends of the arms C, C, being pivotally secured to the truck chassis, and the upper ends slidably secured to the front portion of the bottom of the body B. The upper ends of the arms D are also pivotally connected to the rear portion of the bottom of the body B, the arms D being in two sections, and the lower ends of said arms being movable longitudinally of the body, for purposes to be hereinafter explained.

In Fig. 2 the arms C, C and D, D, are shown in full lines, in raised position. It is to be noted that a track 1 is provided in the chassis A, on each side thereof. The lower ends of the arms D are pivotally mounted on a shaft 2, carrying a roller 3 at each end, said rollers 3, 3 being mounted in the tracks 1, 1, and adapted for anti-frictional movement therein. Rigidly secured on the shaft 2, adjacent the roller 3 on each side, is a support 4, to which is secured a rack bar 5, having downwardly extending teeth 6, as best shown in Fig. 2. It is clear that, when the racks 5 are moved rearwardly of the chassis, the rollers 3, 3 will be similarly moved in the tracks 1, 1, and the arms D, D carried by the shaft 2 will tend to assume a vertical position. Such movement of the arms D, D will obviously cause the arms C, C to assume a more vertical position also, resulting in an upward movement of the truck body B. Manifestly, a reverse movement of the racks 5, 5, will cause a movement of the body B in the opposite direction. In the present invention the racks 5, 5, are moved in each direction by power from the truck motor, which may be connected and disconnected to and from the hoisting mechanism contained in the gear box 7, best shown in Fig. 2, the gearings being illustrated in Figs. 8 and 9.

Now referring specifically to Fig. 8, in which the top of the gear box is removed, it will be noted that a shaft 8 extends through the box 7, and carries a pinion 9 on each end, each pinion 9 being in mesh with the teeth 6 on racks 5 on each side, as shown in Fig. 2. Mounted on the shaft 8, within the box 7, is a relatively large worm gear wheel 10, carrying a hub 10' rigidly secured thereto and rotatable around the shaft 8. Fixed upon the hub 10' and rotatable therewith is a pinion 11, and a large gear 12 is mounted upon the shaft 8, and rotates therewith.

In an extension of the box 7, is mounted an idler shaft 13, carrying a relatively large gear 14, in mesh with the pinion 11, and also carrying a pinion 15, in mesh with the gear 12 carried by the shaft 8. By this construction it is obvious that a drive in one direction, imparted to the worm wheel 10, at one side of the casing 7, will impart a similar impulse to the shaft 8 at the other side of the casing.

In an extension 7' of the casing 7, is carried mechanisms for driving the shaft 8, and for causing a reversal of the movement of said shaft. Said mechanism comprises a drive shaft 16 which has bearings in the extension 7', and extends into the casing 7, terminating in a worm-drive gear 16', in mesh with the worm gear 10. The shaft 16 carries a gear 17 and a gear 18. A power shaft 19 extends into the casing 7', and carries a gear 20, slidably mounted thereon, and clutch mechanism 21 is provided to move the gear 20 longitudinally of the shaft 19. An idler gear 22 is mounted in bearings in the extension 7', said gear being always in mesh with the gear 17. The clutch 21 is actuated by a shaft 23, and is adapted to throw the gear 20 into mesh with the gear 18, to drive the shaft 16 in one direction, or to connect said gear 20 with the gear 22, in mesh with the gear 17, to drive the shaft 16 in a reverse direction. A hand lever 24, see Fig. 3, is moved to actuate the clutch 21, said lever being operatively connected for this purpose, to the shaft 23.

From the foregoing it will be seen that the casing 7 houses a train of reducing gearing, it being noted that the reduction ratio may be varied as desired, by changing the relative dimensions of the components. The gear 10, the hub 10' and the pinion 11 rotate as a unit around the shaft 8, under power imparted to the gear 10 by the gear 16'. For example let it be assumed that the pinions 11 and 15 are of the same dimensions, and that the gears 12 and 14 are of the same dimensions; also that 5 revolutions of the pinion 11 are necessary to cause one rotation of the gear 14. Under these conditions, with the pinion 11 rotating the gear 14, there is a gear reduction of 1 to 5. The pinion 15 turns with the gear 14, and said pinion is in mesh with the gear 12, resulting in another 1 to 5 reduction, or a 1 to 25 reduction from the pinion 11 to the gear 12. Such reduction is necessary with the heavy loads carried by the truck body; otherwise the spirals on the gears 16' and 10 would be destroyed, or the shaft 16 would break under torque.

The power to elevate and lower the body B is taken from the truck motor, the latter being indicated in Fig. 3 by the transmission box 25, a rotating power shaft 26 being extended outwardly from said box. A foot lever 27 is mounted adjacent the driver's seat, said lever being pivotally supported at 28 by the floor of the truck and extending thereunder and pivoted to a rod 29 which is also pivoted at 30 to a link 31 having a hub 32 mounted on the shaft 26, all as illustrated in Fig. 3. Now referring to Fig. 10, it will be noted that a curved arm 33 is rigidly secured to the hub 32, said arm 33 being provided with a yoke at its lower end, which straddles a portion of a shaft 34 extending into the box 25. The shaft 34 is the power shaft for delivering power to the shaft 19 which enters the casing 7', see Fig. 8.

Again referring to Fig. 10, it will be noted that a small sprocket wheel 35 is mounted on the shaft 26, and that a rotatable beveled-gear 36 is mounted in the lower portion of the box 25. The shaft 34 carries an extension 37 journaled in the side of the box 25, and a beveled gear 38 is slidably mounted on the extension 37 and keyed thereto. The yoke on the lower end of the arm 33 straddles the extension 37 of the shaft directly behind the gear 38, and it is obvious that depression of the pedal on the lever 27 will cause the arm 33 to move the gear 38 into mesh with the gear 36. Clutch collars 39 will also cause disengagement of the gears 36 and 38, when the lever 27 is released and returned to normal position by the customary spring control. When the gears 36 and 38 are connected, power will be applied, from the shaft 26, to rotate the shaft 34.

Again referring to Fig. 3, it will be noted that the rear end of the shaft 34 is journaled in a bracket 40 fixed to the truck frame. Adjacent the bracket 40 a sprocket 41 is mounted on the shaft 34. The front end of the shaft 19 has bearing in the truck body at 42, shown in dotted lines in Fig. 3, and a sprocket wheel 43 is mounted on said shaft, a sprocket chain 44 being trained over the sprocket wheels 41 and 43. From the foregoing it will be clear that a pressure upon the pedal 27 will operate to elevate the arms C and D, through the shafts 34 and 19, the gear 20 at this time being in mesh with the gear 18. After the load is dumped the lever 24 is actuated to disengage the gears 18 and 20 and to cause the gear 20 to rotate the gear 17 in an opposite direction through the idler gear 22. Continued rotation of the shaft 19 will then operate to lower the body B under power from the motor of the truck, as will be understood.

The means whereby the body B may be selectively tilted to any one of three positions, is as follows:

Each of the arms D is composed of two sections 44 and 45, lying in adjacent planes, as clearly illustrated in Figs. 4 to 7, the end portion of the section 45 being downwardly offset near the point 46, where it is pivotally connected to the arm C. The offset portion 47 of the section 45 is provided with a stepped portion forming a shoulder 48 and an inclined face 49.

Secured to the outer side face of the section 44, adjacent the pivotal point 46, is a metallic guideway 50, fastened to the said section by connectors 51, 51, bolted or otherwise secured thereto. Between the guideway 50 and the section 44 is slidably mounted a dog 52, adapted to be reciprocated longitudinally of the said section 44 by means of a rod 53 extending rearwardly of the truck body B, and controlled by a hand lever 54, as shown in Fig. 1. The operating mechanism for reciprocating the dog 52, by means of the rod 53, may be identical with that shown in my patent previously referred to.

In Fig. 1 the dotted lines illustrate the body B raised to three different positions of inclination, all of these positions being dependent upon the position of the dog 52. The three different positions are marked X, Y and Z, respectively. In the first dotted line position X, the dog 52 is not in engagement with the section 47, and the sections 44 and 45 of the arms D pivot independently of any restraint by the dog. The power applied from the motor operates, through the racks, as above explained, to move the rollers 3 rearwardly in the tracks 1, 1. Such movement naturally raises the arms C, C, and since the dog 52 is not in position to interconnect the sections 44 and 45 of the arms, the said sections merely pivot around the point 46, the front end of the body B being raised by the arms C and the rear end of said body merely resting upon the framework of the truck.

To elevate the body B to the position marked Y, the handle 54 is manipulated to cause the dog 52 to move into the position shown in Fig. 5, it being noted that the top surface of the face 49 is in parallelism with and adjacent the top surface of the section 44 of the arm D, and that the dog locks the section 44 to the offset 47 of the arm D and prevents the pivotal movement which is possible in position X. In position Y, as above described, when the power is applied to raise the hoisting arms, the rear ends of the sections 44 are lifted off the truck frame, since the sections 44 and 45 are, in effect, integral structures. In this position the rollers 3 are moved further towards the rear of the truck, and the pivotal point 46 is also shifted rearwardly. It is to be here noted that the front end of each of the arms C carries a small roller 54, which rides in a short track formed in an angle iron 55 carried by the lower portion of the body B. The rearward shift of the pivotal point 46 causes the rollers 54 to move towards the rear end of the body B.

To elevate the body to position Z, the dog 52 is manipulated to lock together the sections 44 and 45 of the arms D, when the top surface of the offset 47 is flush with the top surface of the section 44, as illustrated in Fig. 6. In this position, when the rollers 3 are moved to the point nearest the rear of the truck frame, as indicated in Fig. 1, the body will assume the position shown at Z in Fig. 1. This is true because the sections 44 and 45 are interlocked by the dog 52, and the combined arms, composed of the sections 44 and 45, are straightened out so as to give a higher lift than is possible in position Y.

Fig. 4 shows the position of the sections 44 and 45 of the arms D, when the body B is in position for hoisting on the truck frame. All regulations of the position of the dog 52, to govern the height and inclination of the body B, are made before the power is applied to the hoisting mechanism. If position X is desired the dog 52 is allowed to remain as illustrated in Fig. 4. It is moved to the point shown in Fig. 5 if position Y is necessary, or to the point shown in Fig. 6 if position Z is desired. Having properly adjusted the dog 52 the lever 27 is actuated to transmit power to the shaft 19, and the load is elevated, and is dumped by way of the customary extensible chute not herein shown. The lever 24 is operated to reverse the rotation of the shaft 16, and the body B is lowered by power from the shaft 19.

Fig. 7 shows the method of utilizing a common pivot 46 for connecting the arms C and D, and also for connecting the sections 44 and 45 of the arms D. A bracket 56 is bolted to the arm D near the pivotal point, and carries a flange 57 embracing the end of the section 44, adapted to receive the headed pivot pin or bolt 46 which extends through the sections 44 and 45, and through the center of the arms C. A nut 58 retains the pin 46 in position.

From the foregoing it will be obvious that I have provided means whereby to apply power from the truck motor, to elevate and lower the load-carrying body, combined with means adapted for adjustment so that said body may be hoisted to any one of three selected positions. Such trucks are utilized for hauling various commodities. In transporting and delivering coal, the high dumping positions Y and Z are necessary to insure a speedy run of the coal out of the delivery chute, thereby saving the time of the operator, the higher the position of the body, the quicker the flow of coal. In hauling bricks, or other building material, the commodity may be dumped from position X.

The self-locking worm gear drive obviates the necessity of the provision of manually operating ratchets or locks to retain the body in its elevated position while the load is being dumped. It also eliminates brakes for controlling the speed of the body when it is being lowered. Raising and lowering the body by power manifestly prevents accidental fall thereof, and reduces chassis strains.

Modifications of the structure herein described may be suggested to those skilled in the art, but the invention covers all embodiments falling fairly within the scope of the appended claims.

What I claim is:

1. An arm for hoisting devices comprising two sections lying in adjacent parallel planes and pivotally connected each to each, one of said sections being provided, beyond the point of pivotal connection, with a downwardly turned offset portion forming an incline terminating in a shoulder, and means carried by the other section and movable into position to contact either said incline or the surface of the other section above said shoulder, whereby to lock the sections together in any one of two positions of pivotal adjustment of said sections.

2. An arm for hoisting devices comprising two sections lying in adjacent parallel planes and pivotally connected each to each, one of said sections being provided, beyond the point of pivotal connection, with a downwardly turned offset portion forming an incline terminating in a shoulder, and means carried by the other section and slidable into position to contact either said incline or the surface of the other section above said shoulder, whereby to lock the sections together in any one of two positions of pivotal adjustment of said sections.

3. An arm for hoisting devices comprising two sections lying in adjacent parallel planes and pivotally connected each to each, one of said sections being provided, beyond the point of pivotal connection, with a downwardly turned offset portion forming an incline terminating in a shoulder, and means carried by the other section and movable into position to contact either said incline or the surface of the other section above said shoulder, whereby to lock the sections together in any one of two positions of pivotal adjustment of said sections, said means comprising a dog embracing said first mentioned section, and movable into position to brace the other section.

In testimony whereof I affix my signature.

JOSEPH D. HERRON.